July 7, 1970  H. F. DANICO ET AL  3,519,295
FISHING ROD CONNECTOR
Filed Sept. 4, 1968
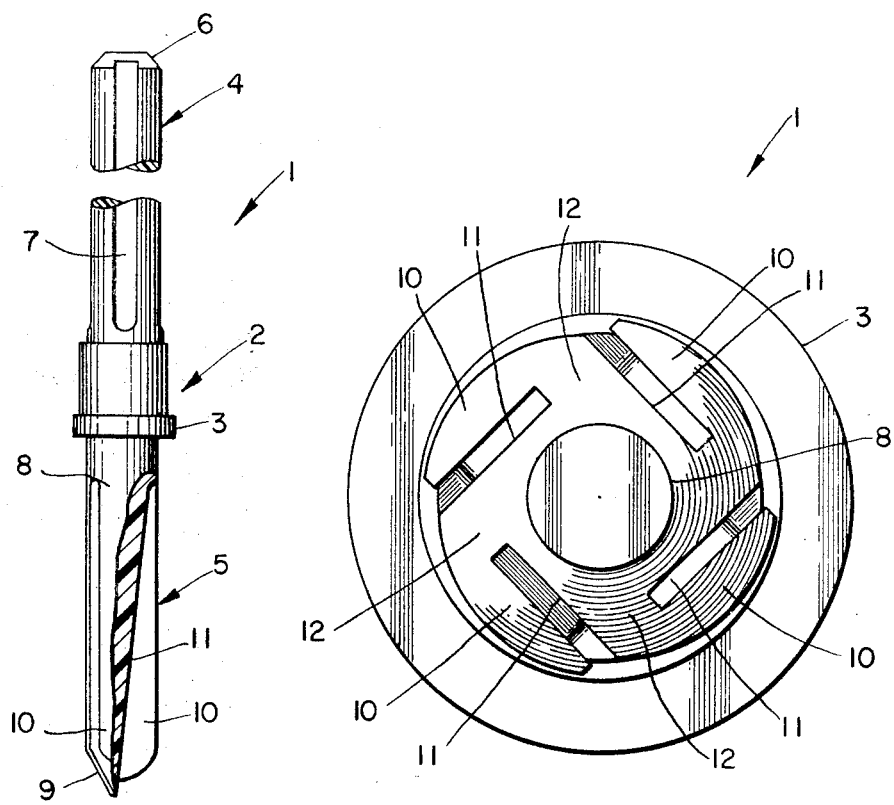
FIG. 1      FIG. 2
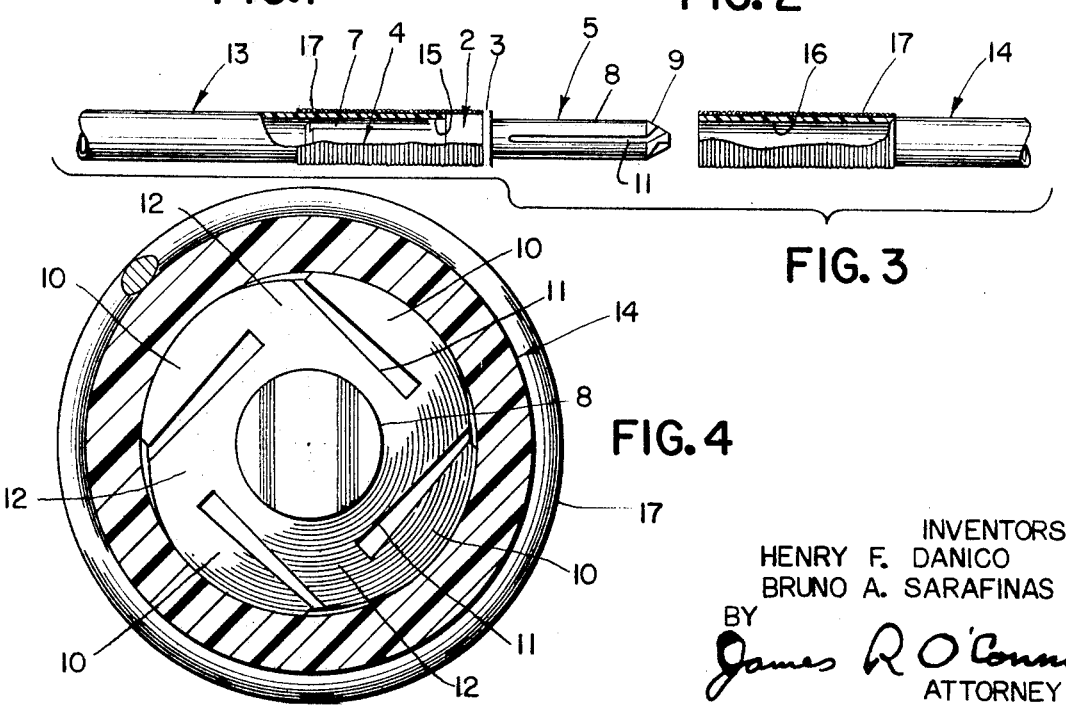
FIG. 3
FIG. 4
INVENTORS
HENRY F. DANICO
BRUNO A. SARAFINAS
BY James R. O'Connor
ATTORNEY United States Patent Office 3,519,295
Patented July 7, 1970

3,519,295
FISHING ROD CONNECTOR
Henry F. Danico, Stoneham, and Bruno A. Sarafinas, Lexington, Mass., assignors to United-Carr Incorporated, Boston, Mass., a corporation of Delaware
Filed Sept. 4, 1968, Ser. No. 757,307
Int. Cl. E04b 1/48
U.S. Cl. 287—127                                      4 Claims

ABSTRACT OF THE DISCLOSURE

The butt and forward end sections of a dismantlable fishing rod are joined by a synthetic resinous connector. One end of the connector is fixedly retained in an open ended bore in one of the rod sections and the opposite end of the connector is frictionally, releasably seated in an open ended bore in the other rod section. The said opposite end of the connector is longitudinally slotted and includes a plurality of resilient wings which are compressed radially inwardly to provide a controlled, leaf spring type take-up over the total area of engagement between said connector and said other rod section.

DESCRIPTION OF THE PRIOR ART

Heretofore in the art it has been known to connect abutting sections of a knockdown fishing rod by jamming the adjacent ends of the sections into a rigid or springy sheet metal sleeve. Likewise, it has long been the practice to equip the rear end of the more tapered, forward rod section with a male sheet metal ferrule which is jammed into an axial bore in the wider butt rod section, the latter, in some instances, having a female sheet metal ferrule seated in its bore. The prior art also discloses combinations wherein a male ferrule tipped section is jammed into a split female ferrule on the other section and the connection is secured by a knurled locking collar which is subsequently tightened over the joint. Over the years, the above described fittings have proved troublesome in that it is difficult to insure close tolerance matching of the mating parts so that the rods so equipped will be easily assembled and dismantled while at the same time providing a tight enough connection to prevent accidental disengagement when the rod is in use. Often times metal ferrule equipped rods are left in the assembled condition for long periods of time and corrosion sets in, particularly where the rods have been fished in salt water, thus making disassembly extremely difficult. Further, the mating male and female ferrules often become worn after repeated assembly and disassembly of the rod sections and the joint thus becomes progressively looser.

A relatively recent improvement in the art comprises a sheet metal female ferrule having a synthetic resinous sleeve captured therein. While this latter device tends to eliminate the corrosion and excessive wear problems, it is a rather expensive solution in that an additional component part which must be preassembled is introduced into the fastener combination.

The present invention substantially eliminates all of the problems characteristic of the prior art devices described above and provides a simple, inexpensive and highly efficient solution as will become evident from a consideration of the detailed description which follows hereinafter.

SUMMARY OF THE INVENTION

According to the invention, the butt and forward end sections of a dismantlable fishing rod are releasably coupled by a synthetic resinous connector. Each of the rod sections has an open ended, axial bore formed in the adjoining ends thereof. The connector is of generally cylindriform configuration and includes a solid end portion which is fixedly seated in the bore in the butt end section of the rod and an opposite end portion having a solid core and a plurality of circumferentially spaced, resilient wings disposed about the periphery of the core, which opposite end portion is seated in the bore in the forward rod section such that the said wings are compressed radially inwardly toward the core. The effective inside dimensions of the bore in the forward rod section and the effective outside dimensions of the opposite end portion of the connector are selected so that the radial force imparted to the wall of the forward rod section defining the bore therein by the wings over the total area of engagement of the wings with said wall is sufficient to prevent accidental separation of the rod sections under normal conditions of usage while at the same time permitting manual separation of the rod sections by a modest axially opposite pull applied to the sections.

DESCRIPTION OF THE DRAWING

FIG. 1 is a side elevation (partly in section) of an improved fishing rod connector according to the invention;

FIG. 2 is a plan view of the connector as viewed from the lower end of FIG. 1;

FIG. 3 is a fragmentary, horizontal elevational view of two fishing rod sections depicting the connector of FIG. 1 fixed to one section and about to be press fitted into the second section; and FIG. 4 is a cross sectional view of the fishing rod section depicted on the right in FIG. 3 showing the connector seated therein.

DESCRIPTION OF THE PREFERRED EMBODIMENT

The connector 1, which is of generally cylindriform configuration, is of unitary, molded, synthetic resinous construction, for example, the acetyl resin marketed by Du Pont under the registered trademark "Delrin." The aforesaid material is characterized by its stiffness, good tensile strength, creep resistance over a wide range of temperature variations, high fatigue endurance and resilience for applications requiring springiness and toughness. However, it is anticipated that the connector might be molded from other tough, resilient synthetic plastics.

Structurally, the connector includes an intermediate base section 2 having a radially enlarged flange 3 at one end thereof, a first end portion 4 extending axially in one direction from the base section and a second end portion 5 extending axially in the opposite direction from the base section. The end portion 4 is solid and has an inwardly tapered free end 6 and a plurality of longitudinal, circumferentially spaced grooves 7. The opposite end portion 5 has a solid core 8 which is inwardly tapered at its free end 9 and a plurality of circumferentially spaced, resilient wings 10 disposed outwardly of the periphery of the core. The wings are inwardly defined by a plurality of slots 11 which extend longitudinally along a major portion of the length of the end portion 5 and, as best depicted in FIG. 2, the slots extend generally chordally with respect to an imaginary circle defining the circumference of the said end portion. The wings are joined to the core 8 by webs 12 which are of substantial thickness. The slots 11 are progressively longitudinally tapered in depth from their ends adjacent the free end 9 to their ends adjacent the flange 3 of the base section to provide progressively increasing flexibility in the wings 10 toward the leading end of the connector portion 5. Ideally, the length of the end portion 4 of the connector is on the order of 1" and that of the end portion 5 is on the order of 1¼". The external diameter of the end portions 4 and 5 is approximately ¼".

In the application depicted in FIGS. 3 and 4, the adjoining ends of the butt section 13 and the forward section 14 of a dismantlable fishing rod, which may be constructed from fiber glass or other suitable materials are each reamed to depths of 1" and 1¼", respectively, to provide open ended, internal bores 15 and 16 therein. Since the forward section of the usual fishing rod will taper progressively inwardly toward its outer end, the bore 16 is progressively tapered from a maximum diameter at its open end to a minimum diameter at its inner closed end. The internal side wall and end wall of the bore 15 is subsequently coated with an epoxy cement and the end portion 4 of the connector is pressed into the said bore until the base section 2 abuts the forward end of the rod section 13. The longitudinal grooves 7 take up excess epoxy and thus aid in providing a stronger connection when the cement ultimately sets. The forward end of the butt section 13 and the base section 2 of the connector up to the flange 3 are thereafter wrapped with the binding thread 17 which secures the line guides to the rod in the usual manner. The wrapping provides still greater strength in the joint and guards against splitting of the reamed portion of the rod. The rear end of the forward rod section 16 is likewise wrapped with binding thread for the purposes above recited.

To join the rod sections, the end portion 5 of the connector is axially inserted into the bore 16 in the forward section until the rear end of said section abuts the flange 3 on the connector. As the connector portion 5 is pressed into the bore, the resilient wings are compressed radially inwardly to effect a controlled, leaf spring type take-up over the total area of engagement with the rod section. Since the bore 16 tapers inwardly, the leading ends of the fins are flexed to a greater extent than the ends thereof adjacent the base section and the rearwardly decreasing depth of the slots 11 earlier described allows for this required greater flexibility in the leading ends of the fins. The connector thus provides for a tight frictional joint between the rod sections which will effectively resist accidental separation of the rod sections under normal usage conditions. Ideally, the separation resistance is on the order of 7 to 10 lbs. of axial pull applied in opposite directions to the rod sections. However, the internal diameter of the bore 16 and the external diameter of the connector portion 5 as well as the permissible extent of the flexing of the wings 11 may be selected to provide greater or lesser separation resistance as desired in different sizes of rods. The reader will, of course, appreciate that the leaf spring type take-up which is characteristic of the connector permits a reasonably wide tolerance variation in the connector end portion 5 and the bore in the forward rod section with minimal loss of holding power in the joint or without substantially increasing the insertion force required to effect the connection depending on whether the tolerance variations in the mating parts are on the high or low side as the case may be. Since the molded plastic connector is noncorrodible, exposure to the elements will have negligible effect on the joint in situations where the rod sections are left connected over extended time periods.

We claim:
1. A fishing rod comprising releasably coupled sections joined by a synthetic resinous connector, each of said coupled sections having an open ended, axial bore formed in the adjoining ends thereof, said connector being of generally cylindriform configuration and having a first end portion fixedly seated in the bore in one of the rod sections and a second end portion having a plurality of circumferentially spaced, resilient wings disposed about its periphery, said first and second end portions extending in axially opposite directions from an intermediate base portion, said resilient wings being at least partially spaced from said second end portion by a plurality of elongate slots extending parallel to but spaced from the longitudinal axis of said end portion and chordally with respect to the circumference of said end portion, said slots having a length greater than one half the length of said second end portion, the width of said slots at their ends remote from said base portion being at least equal to the width of said slots at their ends proximate said base portion, and the slots being progressively reduced in depth from the remote end of said opposite end portion toward said base portion, said second end portion being seated in the bore in the other rod section such that said wings are flexed radially inwardly and said base portion is butted against the adjoining ends of said rod sections, the effective inside dimensions of the last-mentioned bore and the effective outside dimensions of said second end portion of said connector being selected so that the radial force imparted to the wall of said other rod section defining said bore by the said wings over the total area of engagement of said wings with said wall is sufficient to prevent accidental separation of the rod sections under normal conditions of usage while at the same time permitting manual separation of the rod sections responsive to the application of a relatively modest axially opposite pull on said rod sections.

2. A fishing rod according to claim 1 wherein the bore in said other rod section is progressively narrowed from its open end toward its axially inner end thereby providing progressively increased inward flexing of said wings toward the leading end of said second end portion of said connector.

3. A fishing rod according to claim 1 wherein said first end portion of said connector is solid and is cemented in the bore in said one rod section, and said second end portion of said connector has a solid axial core.

4. A synthetic resinous connector for releasably coupling two hollow structural members, said connector being of generally cylindriform configuration and including a solid end portion adapted to be seated in one of the structural members and an opposite end portion having a solid core and a plurality of radially flexible wings which is adapted to be releasably press fitted in the other structural member, said end portions extending in axially opposite directions from an intermediate base portion which is adapted to be butted against the adjoining ends of said structural members, said wings being defined inwardly toward said core by a plurality of longitudinal slots formed in said opposite end portion and extending chordally with respect to the circumference of said end portion, said slots also being spaced from the longitudinal axis of said opposite end portion, said slots having a length greater than one half the length of the opposite end portion, the width of said slots at their ends remote from said base portion being at least equal to the width of said slots at their ends proximate said base portion, and said slots being progressively reduced in depth from the remote end of said opposite end portion toward said base portion.

References Cited

UNITED STATES PATENTS 78,459  6/1868  Kirtland _____ 287—127 XR (Other references on following page)

| | UNITED STATES PATENTS | | |
|---|---|---|---|
| 798,706 | 9/1905 | Rockwell. | |
| 1,198,263 | 9/1916 | Pajeau. | |
| 2,125,018 | 7/1938 | Hamill | 85—82 XR |
| 2,536,388 | 1/1951 | Murray | 287—126 XR |
| 2,819,880 | 1/1958 | Gilchrist | 287—2 |
| 3,253,846 | 5/1966 | Garcia | 287—127 |

FOREIGN PATENTS

| 1,045,292 | 6/1953 | France. |
|---|---|---|
| 1,342,218 | 9/1963 | France. |
| 1,452,261 | 8/1966 | France. |

DAVID J. WILLIAMOWSKY, Primary Examiner

A. V. KUNDRAT, Assistant Examiner

U.S. Cl. X.R.

43—18